July 23, 1968 H. FLOOD 3,393,797

ELECTRICAL COMPONENT HANDLING DEVICE

Filed Dec. 15, 1965

INVENTOR.
Henry Flood

BY Walter S. Zebrowski

ATTORNEY

United States Patent Office 3,393,797

Patented July 23, 1968

3,393,797

ELECTRICAL COMPONENT HANDLING DEVICE

Henry Flood, Bradford, Pa., assignor to Corning Glass Works, Corning, N.Y., a corporation of New York Filed Dec. 15, 1965, Ser. No., 514,094

12 Claims. (Cl. 206—56)

ABSTRACT OF THE DISCLOSURE

A shipping and storage container for tubular-like articles suitable for automatic loading by article forming equipment and automatic unloading to article utilization equipment.

Heretofore, electrical components such as resistors, capacitors, or the like would be formed by a suitable apparatus and then collected in a bulk container for example. The components would then require additional handling to suitably package them for shipping. For example, such packaging consisted of attaching the components to a tape at regular intervals, which tape would thereafter be arranged in a suitable container. Another method of packaging consisted of placing the components at regular intervals in cutouts in a paperboard member which would also be thereafter arranged in a suitable container.

After the components were shipped to the point of utilization, they would be removed from the shipping container and fed to a utilization apparatus by means of a vibration type feeding device or the like, for example.

Much product shrinkage results from the prior art methods of handling electrical components defective since they could not be utilized by automatic equipment. In addition, excessive handling greatly increased the product cost. Furthermore, the cost of the product was increased by the cost of intermediate packaging.

Accordingly, it is an object of this invention to provide an economic apparatus for handling electrical components which would reduce lead bending.

Another object of this invention is to provide an electrical component handling device which would reduce packaging costs while increasing efficiencies in loading and unloading process equipment.

A further object is to provide a device which would reduce the need for physical handling and would be suitable for shipping and storage of electrical components.

Broadly according to the present invention a handling device suitable for automatically loading and unloading process equipment and also suitable for serving as a shiping and storage container for tubular-like electrical components is provided comprising an open ended container, the end opposite the open end being closed, baffles arranged within said container to provide a sinusoidal-like pathway from the open end to the closed end, said pathway being of such size as to permit the components to fall freely due to gravity, and means at the open end suitable for attachment of the device to process equipment.

Additional objects, features and advantages of the present invention will become apparent to those skilled in the art from the following detailed description and the attached drawing on which, by way of example, only the preferred embodiment of this invention is illustrated.

The device of the invention is suitable for handling resistors, capacitors, or other tubular-like electrical components that have leads substantially along their longitudinal axis.

Figure 1:
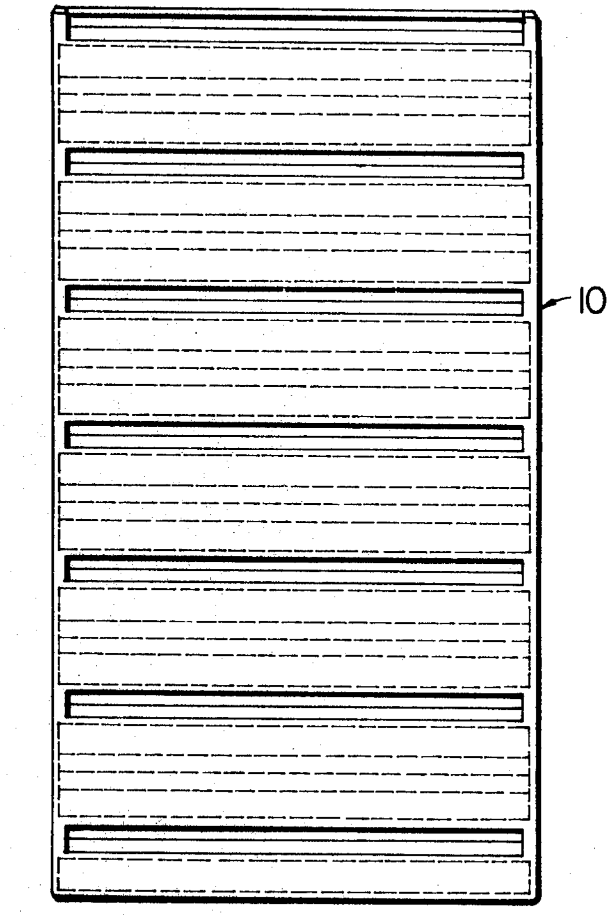
FIGURE 1 is an elevational view of the device of this invention.
Figure 2:
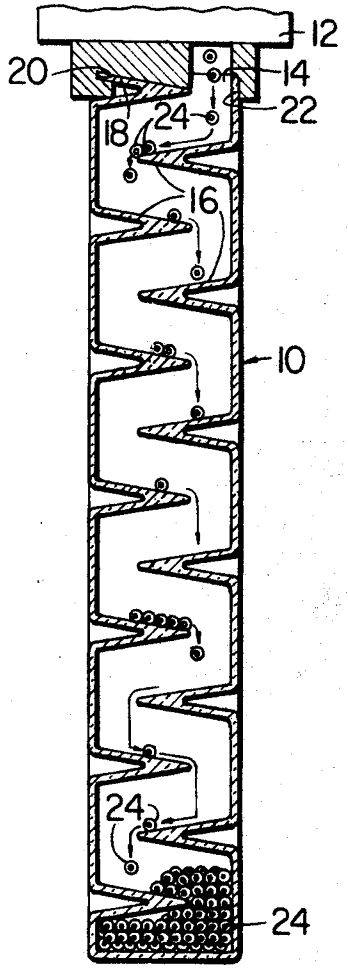
FIGURE 2 is a cross sectioinal view of the device of this invention being loaded with electrical components.
Figure 5:
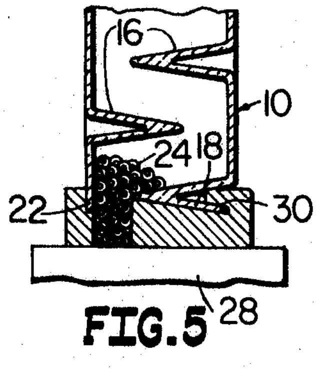
FIGURE 5 is a fragmentary cross sectional view of the device of this invention being unloaded.

Referring to FIGURE 1, the handling device 10 of this invention is illustrated. Referring additionally to FIGURE 2, device 10 is attached to the output of an electrical component forming apparatus 12. Device 10 has an opening 14 in one end with the end opposite thereto being closed. A plurality of baffles 16 are arranged within the container to provide a sinusoidal-like pathway between the open and closed ends of the device.

Device 10 is shown attached to apparatus 12 by means of lip 18 being disposed in groove 20 formed in apparatus 12, while edge 22 of device 10 is restrained by a portion of apparatus 12 by friction. This is merely one method of attachment and any other method which leaves opening 14 exposed upwardly to the output of the apparatus is also suitable.

Device 10 may be suitably formed of plastics, metals, paperboard, or the like materials.

As the electrical components 24 are produced by apparatus 12 they drop through opening 14 and impinge on the first baffle 16. Since baffles 16 have sloped sides, forming a sinusoidal-like pathway, the components roll down over the edge of the first baffle and drop to the second baffle by means of gravity. The components continue to drop in this manner until they reach the closed end. The device is thereby automatically loaded.

Figure 3:
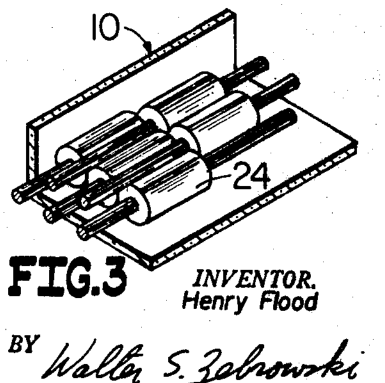
FIGURE 3 is a fragmentary oblique cross sectional view illustrating how the electrical components are nested in the handling device.

The internal width of device 10, corresponding to the direction of the length of the components, is made of sufficient size to accommodate the component and its leads plus the length of an extra component body. By forming the device to such a width, the components will automatically nest themselves in the manner illustrated in FIGURE 3. It is apparent, therefore, that a much higher volume efficiency or capacity may be attained by such construction since adjacent component bodies will overlap one another sideways. It should be noted that the width of device 10 may be made of sufficient size to accommodate the component and its leads alone, if component nesting is not desired.

Figure 4:
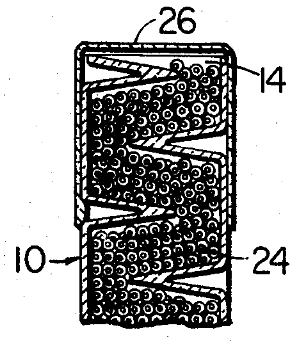
FIGURE 4 is a fragmentary cross sectional view of the device of this invention sealed for shipment.

After device 10 is filled to opening 14, it is removed from apparatus 12 and may then be sealed for shipment by any suitable means such as plastic cap 26 shown in FIGURE 4.

At the point of utilization device 10 is unsealed and is attached to process equipment 28 such as automatic insertion equipment which inserts an electrical component into a circuit. The means of attaching device 10 to equipment 28 is illustrated by disposing lip 18 in groove 30 formed in equipment 28 while edge 22 of device 10 is restrained by a portion of equipment 28 by friction. The means of attachment to the process equipment is not critical so long as opening 14 is exposed downwardly into the input of equipment 28.

As some components 24 are used, the remainder drop through opening 14 by gravity along the sinusoidal-like path formed by the baffles and the device is automatically unloaded.

It is readily seen that through the use of device 10, the electrical components themselves require no individual handling. Furthermore it has been found that lead bending is greatly reduced and no intermediate packaging is required. The device of this invention provides substantially increased efficiencies in loading and unloading process equipment and in storage as well as shipping, thereby greatly reducing costs. By providing means for nesting the electrical components, higher device capacity is obtained.

It should be noted that the baffles within device 10 may be formed such that a space is provided at each end thereof between the baffle and the container wall. Such an embodiment is suitable to permit broken pieces of electrical components or other small foreign matter to quickly drop without jamming the whole components.

Although the present invention has been described with respect to specific details of certain embodiments thereof, it is not intended that such details be limitations upon the scope of the invention except insofar as set forth in the following claims.

I claim:

1. A handling device suitable for automatically loading process equipment and also suitable for serving as a shipping and storage container for tubular-like electrical components comprising an open ended container, the end opposite the open end being closed, baffles arranged within said container to provide a sinusoidal-like pathway between the open and closed ends of said container, said pathway being of such size as to permit the components to fall freely due to gravity, and means integral with said device at the open end thereof for attachment of the device to process equipment.

2. The device of claim 1 further comprising means for sealing the open end.

3. The device of claim 1 wherein the components have leads along the longitudinal axis thereof and the internal width of the container corresponding to the direction of the length of the components is at least equal to the length of one component with its leads plus the length of an extra component body to permit side by side nesting of the components.

4. The device of claim 1 wherein the sides of the baffles are sloped.

5. The device of claim 1 wherein the baffles are disposed at opposite interior sidewalls of the container and are integral therewith.

6. The device of claim 5 wherein at least some of the baffles are shorter than the width of the container interior whereby a space is provided between the ends of such baffles and the container sides.

7. The device of claim 6 wherein the shorter baffles are disposed along one interior sidewall of said container.

8. The device of claim 1 wherein said device is maintained attached to said equipment through friction.

9. A shipping and storage container for tubular-like articles suitable for automatic loading by article forming equipment and automatic unloading to article utilization equipment comprising a container having front, back, two sides, and one end enclosed, the end opposite the enclosed end being open, a plurality of baffles arranged within said container to provide a sinusoidal-like pathway between the open and closed ends of said container, said pathway being of such size as to permit said articles to pass therealong freely due to gravity, and means at the open end integral with said container for attachment of said container to said equipment.

10. The container of claim 9 wherein the baffles are disposed on the interior surfaces of said front and back of the container and are integral therewith.

11. The container of claim 10 wherein at least some of the baffles are shorter than the width of the container interior whereby a space is provided between the ends of such baffles and the container sides.

12. The container of claim 9 wherein said container is maintained attached to said equipment through friction.

References Cited

UNITED STATES PATENTS

| | | | |
|---|---|---|---|
| 329,668 | 11/1885 | Moore | 193—27 X |
| 2,418,227 | 4/1947 | Hait | 221—287 X |
| 3,194,620 | 7/1965 | Sauer | 312—45 |

FOREIGN PATENTS

| | | |
|---|---|---|
| 3,387 | 1913 | Great Britain. |
| 649,763 | 1/1951 | Great Britain. |

MARTHA L. RICE, *Primary Examiner.*

UNITED STATES PATENT OFFICE

CERTIFICATE OF CORRECTION

Patent No. 3,393,797 July 23, 1968

Henry Flood

It is certified that error appears in the above identified patent and that said Letters Patent are hereby corrected as shown below:

Column 1, line 33, "results" should read -- resulted --; line 34, after "components" insert -- . For example, physical handling resulted in many bent leads rendering the components --. Column 3, lines 15 and 16, after "loading" insert -- and unloading --.

Signed and sealed this 30th day of December 1969.

(SEAL)

Attest:

Edward M. Fletcher, Jr.

Attesting Officer

WILLIAM E. SCHUYLER, JR.

Commissioner of Patents